June 11, 1963

W. B. MILLER ET AL 3,093,532

APPARATUS FOR FORMING TUBULAR INSULATING
BODIES OF FIBROUS STRUCTURE

Filed July 30, 1958

INVENTORS
WARD B MILLER & WILLIAM H. EWING
BY

ATTORNEYS

INVENTORS
WARD B MILLER & WILLIAM H. EWING
BY
ATTORNEYS

United States Patent Office 3,093,532
Patented June 11, 1963

3,093,532
APPARATUS FOR FORMING TUBULAR INSULATING BODIES OF FIBROUS STRUCTURE
Ward B. Miller, Waterville, and William H. Ewing, Newark, Ohio, assignors to Owens-Corning Fiberglas Corporation, Toledo, Ohio, a corporation of Delaware
Filed July 30, 1958, Ser. No. 751,938
8 Claims. (Cl. 156—430)

This invention relates generally to fibrous tubular bodies capable of serving either as independent ducts or as insulating covers or envelopes for piping.

More particularly this invention pertains to ducts and pipe insulation of fibrous glass, and apparatus and methods for continuous fabrication of such products from a conventional veil of fibrous glass created by gathering and felting the glass fibers attenuated from molten threads in a standard glass fiber forming operation.

The superior qualifications of fibrous glass masses as insulating media are widely known. They possess not only high resistance to heat transfer but also the glass fibers have exceptional strength, and are chemically inert which enables them to withstand exposure to the corrosive action of moisture, mildew, insects and other destructive elements.

Heretofore, it has been the usual practice to build tubular members of fibrous stock in stationary matrices or molds. This is not only a time consuming, costly procedure but also limits the lengths of the products to the dimensions of the mold. With such an arrangement there is also the objectionable intermittent flow of material which necessitates extra handling and temporary storage of material.

Occasional attempts to provide a more expeditious, continuous manufacturing system producing an endless formed tube which may be cut to any length desired have not met with substantial success. Difficulties encountered have related to maintaining the operations coordinated, feeding the fibrous component in an even flow, to the establishment of a selected, uniform density, and to marking of the products by propelling elements of the apparatus.

A prime purpose of this invention is to provide an effective, uninterrupted process and suitable apparatus for fabricating a constantly advancing, tubular body of fibrous glass.

An important object of the invention also resides in the production of a fibrous tube of uniform characteristics including proper porosity and inherent strength to withstand the stresses incurred in handling, transportation and installation.

A further goal of the invention entails the fabrication of a continuous tubing having smooth wall surfaces.

Another object embraces a method and apparatus permitting a selective variation in the density of the tubular product.

An additional object resides in the provision of a process adapted to receive and directly utilize a veil of fibrous glass as delivered from a conventional fibrous glass forming station.

Further objects and advantages of the invention are secured from the improved structure of the fibrous bodies and the special arrangement and design of the apparatus provided.

The present invention involves apparatus for creating a stream of glass fibers and gathering them in veil formation; coating the fibers in the stream with a binding agent or impregnating the formed veil therewith; depositing the veil upon a belt conveyor; then introducing the endless veil within a stationary, shaping casing having a smooth interior surface and winding the veil within the casing in overlapping coil arrangement upon a rotating mandrel having a smooth first portion; quick curing the binder of the fibrous stock in compacted contact with the even surfacing of the casing and the mandrel; and moving the resulting, spirally wound tubular body of fibrous glass axially forwardly by means of an advancing thread upon a second portion of the mandrel in association with a rotating cylinder beyond the stationary casing, the cylinder having internal protuberances engaging the outer surface of the tubular body.

Additional features and beneficial aspects of the invention will be apparent from a study of the specification and the apparatus selected for presentation in the drawings, in which.

Figures 1, 1A:
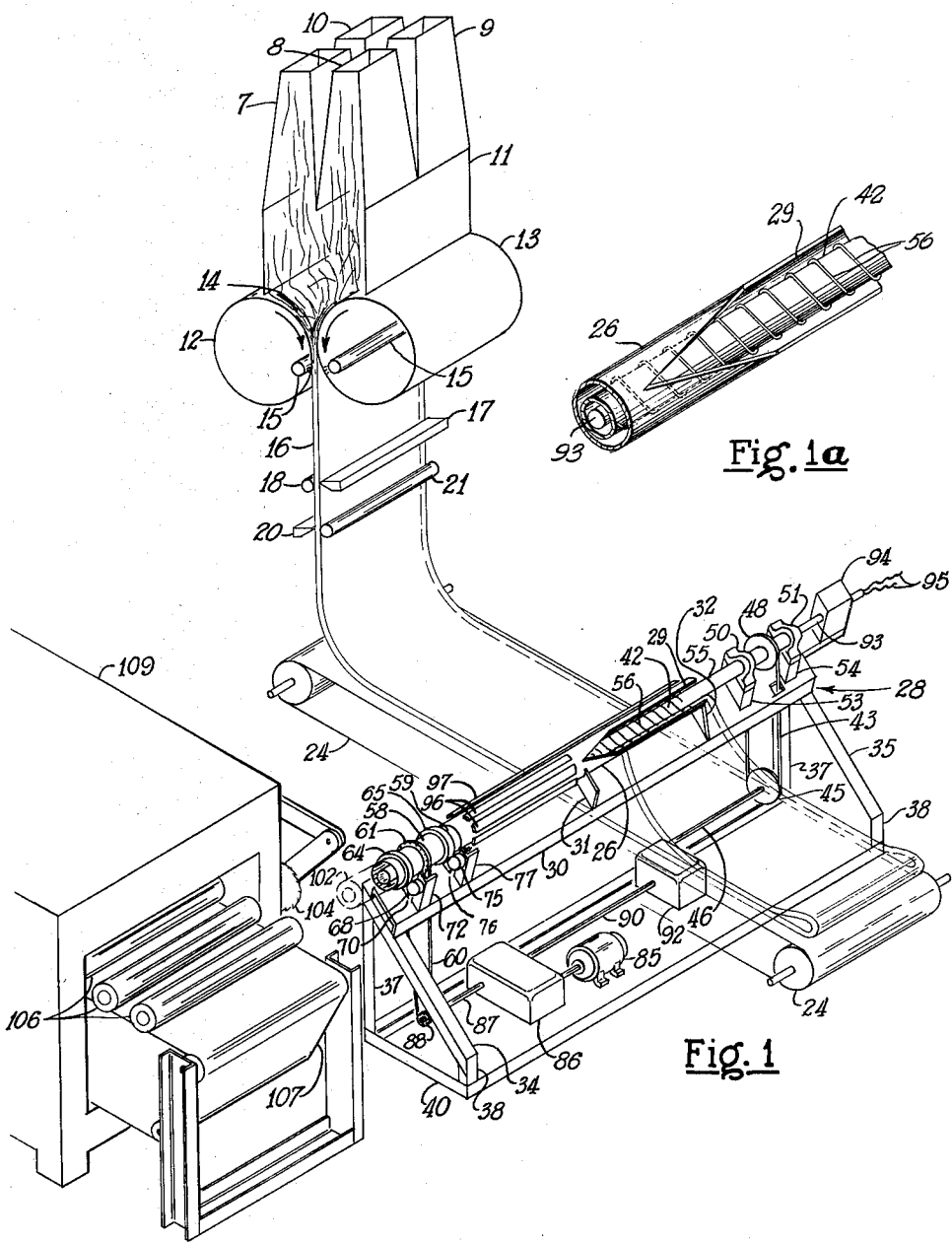
FIGURE 1 is a perspective, rather diagrammatic view of apparatus in a production line incorporating equipment of a design preferred for practicing the invention.
FIGURE 1a is an enlarged, fragmentary view showing a detailed portion of the apparatus of FIGURE 1.
Figure 2:
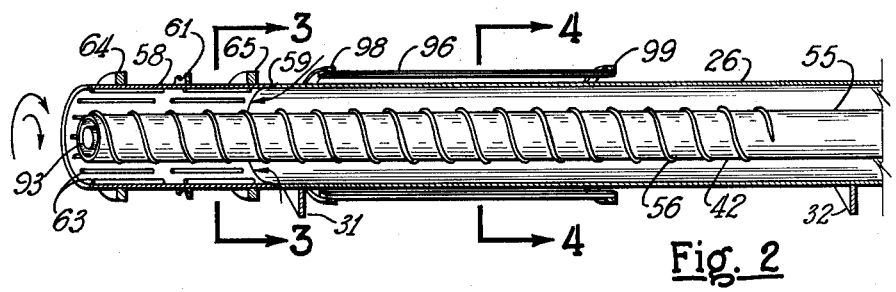
Figure 3:
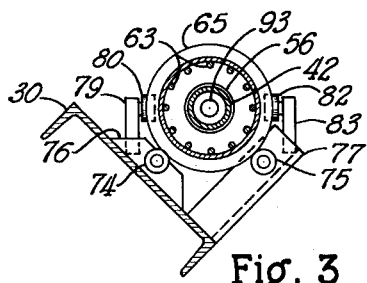
Figure 4:
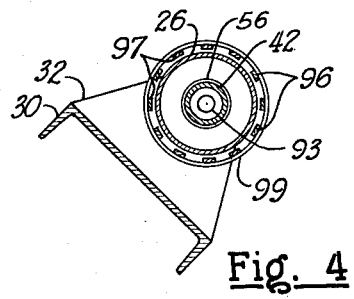
Figure 5:
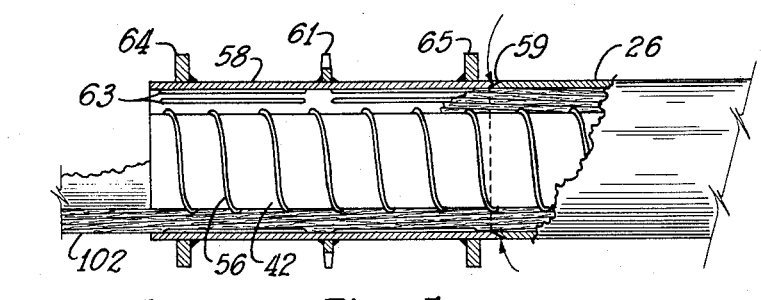
Figure 6:
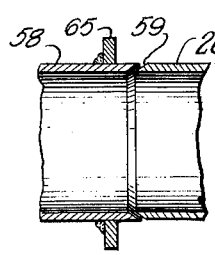

FIGURE 2 relates to a portion only of the apparatus of FIGURE 1, constituting a vertical, longitudinal section of the stationary shaping casing and the rotating cylinder with a part of the axially positioned mandrel shown in full;

FIGURE 3 is a cross-sectional view taken on the line 3—3 of FIGURE 2;

FIGURE 4 is a like view on the line 4—4 of FIGURE 2;

FIGURE 5 is a broken view, partly in section, showing the progress of the shaped fibrous tube from the stationary casing and through the rotating cylinder; and FIGURE 6 is a fragmentary view showing in greater detail the adjacent portions of the stationary casing and rotating cylinder of FIGURE 5.

Referring to the drawings in more detail and first to FIGURE 1, there are schematically portrayed in greatly reduced scale four fibrous glass forming hoods marked with numbers 7, 8, 9 and 10. These hoods are disposed below the forehearth of an unillustrated melting furnace and positioned to receive fibers which, after emerging as molten threads from orifices in bushings set in the base of the forehearth, are attenuated and directed downwardly by blasts of air or steam. As this fiberizing arrangement is quite conventional it is not considered necessary to show the components thereof in the drawing.

Gaseous blasts have also proved satisfactory for drawing fibers of such materials as molten slag, fusible rock and asbestos. Such mineral fibers as well as organic fibrous products are quite readily adapted to this invention.

The elongated fibers entrained in the gas streams travel downwardly into the common settling chamber 11. These fibers may, for example, have an average diameter of twenty hundred thousandths of an inch and be generally two to three inches long. The near side wall of chamber 11 and those of hoods 7 and 8 have been removed from the showing of FIGURE 1 in order that the movement of the fibers within these structures may be indicated. At the bottom of chamber 11 are two foraminous drums 12 and 13 of cylindrical shape, spaced slightly part and rotating on parallel axes toward each other. The interior of the drums are connected to an exhausting blower whereby the gas carrying the fibers is drawn through the perforated surfaces of the drums while the fibers themselves are caught by and collect upon the drum surfaces.

The light mat 14 of fibers thus created on each drum is brought against and combined with the mat built upon the other drum; thus the mats are combined as a composite veil 16 and thrust downwardly through the narrow opening between the drums. The detachment of the mats from the drums is preferably abetted and maintained by air jets directed through the drum perforations against the lines of separation between the mats and the drums from ported piping 15 within the drums. The near end plates of the drums have been removed from FIGURE 1 to reveal the positions of the piping 15.

The composite veil 16 resulting from the union of the two mats, for purposes of explanation, will be taken as having a width of thirty six inches and a weight of fifteen grams per square foot. By decreasing or increasing the speed of rotation of the drums the weight of the veil may be respectively enlarged or reduced.

The veil descends past successive sets of binder applying devices. The first of these comprises a manifold 17 having a slot along the tapered edge adjacent the fibrous veil. Air borne particles of a suitable binder are projected from the slot of the manifold into the veil and distributed therethrough by the cooperating suction effect of air drawn into the elongated exhaust compartment 18 turning adjacent the opposite side of the veil.

This compartment has an outer foraminous rolling member positioned close to the veil and rotatable upon contact with the veil so as not to hinder the downward movement thereof. Interiorly of the rolling member is a hollow shaft upon which the rolling member is mounted and through which suction is produced by a suitable blower connected to the shaft.

The second binder applying device has similar components which are alternately positioned in respect to the veil, with the manifold 20 and compartment 21 placed on opposite sides of the veil from those adjacent to which the manifold 17 and compartment 18 of the first set are located.

A powdered binder which is recommended for this distributing arrangement is prepared from a combination of Vinsol, and phenol formaldehyde in the "B" stage. Vinsol is a thermoplastic resin fractionally derived from a steam distillate of Southern pine. Other dry, comminuted binder substances such as melamines and polyesters are quite suitable for impregnation of the veil in the above system. Alternately, binders in liquid suspensions or solutions may be applied by air atomizing instruments. The latter may conventionally be positioned to disperse the binding material among the fibers while they are descending within the hoods or within the settling chamber 11.

The veil 16, impregnated with binder in the amount of ten to twenty percent by weight, is received and transported by belt conveyor 24 at a speed in this case of thirty-three feet per minute. From the further end of the belt the veil is looped back into the stationary casing 26 of the tube shaping mechanism 28 and passes below and around the mandrel 42 located axially within the casing. An entering path into the casing is provided by a longitudinal opening 29 in the side wall thereof. The inner end of the longitudinal opening 29 in the casing 26 is shown in the enlarged view of FIGURE 1a so as to better illustrate the relationship of the associated elements.

The veil is, in this instance, directed within a horizontal plane into the casing preferably at an angle to the longitudinal axis thereof of about one hundred and fifteen degrees. This angle is estimated as being midway between those which the edges of the veil take in their spiral paths as the veil is wound upon itself around the mandrel within the casing, and is derived from the particular conditions set forth herein in discussing a specific procedure. The different angles of the circumferential travel of the two edges of the veil are due mainly to the frustum shape of the wrapped veil over which the arriving veil is continuously turned.

For the fibrous tubular product taken as an example in this discussion a final density of three and one-half pounds per cubic foot is desired. It is calculated that with a veil of the previously cited specifications such a tubing should be formed with approximately a nine ply thickness or nine layers of the veil. The advance of one turn of the veil over the next following turn is then four inches with a corresponding free extending overlap of four inches of the last turn of the veil against the mandrel at the narrow end of the frustum configuration.

It will be understood that one edge of the entering veil, as it turns and is compacted against the inner surface of the casing of four inch inside diameter, follows a spiral path around the diameter of approximately four inches of the preceding eight layers of wrap while the opposite edge follows a spiral path around the mandrel having a diameter of only two inches. As the longitudinal advance of the two spiral paths is the same (four inches) it may be understood that the one around the smaller diameter must be at a greater angle in order to span an equal longitudinal distance.

The veil is of a light, fluffy nature, easily elongated and compacted, and so readily adapts itself to the wrapping action which progressively requires greater length in the deposited veil from the narrow to the broadened end of the frustum shaped core of wound veil.

The casing is secured in place upon the inverted channel 30 through welded supporting flanges 31 and 32. The channel 30 is mounted at a conforming declivity upon downwardly sloping end frame arms 34 and 35 which in turn are supported upon two pairs of end posts 37 and 38. These project upwardly from the corners of the rectangular base 40 of the frame.

The veil is wound helically upon itself around the mandrel 42. The latter is rotated clockwise, as viewed from the left of FIGURE 1, through the propelling action of belt 43 running between pulley 45 on drive shaft 46 and pulley 48 secured to the mandrel 42. The mandrel is journalled in bearings 50 and 51, held on blocks 53 and 54 on opposite sides of pulley 48.

The mandrel 42 may be composed of standard pipe of two inch outside diameter with an initial polished surface portion 55 which first contacts the veil. The formed tubular fibrous product then has an interior diameter of two inches established by the diameter of the mandrel and an outside diameter of four inches to which it is restrained and compacted by the like inside diameter of the casing 26.

After the starting smooth area of the mandrel, within a shallow groove machined helically around the surface of the mandrel, is laid under heat and tension a one eighth inch wire 56 of drill rod stock. This forms an external right hand thread with a one inch pitch. While these particular dimensions are considered effective they are of course not critical and elements of different specifications and interrelation may be utilized without loss of function.

The wire 56 wound helically around the mandrel forms a thread thereon which advances around the mandrel in a direction opposite to the clockwise direction in which the mandrel is rotated. Accordingly, the fibrous tube developed upon the mandrel by the winding of the veil 16 thereon is inclined to be moved forwardly and axially of the casing 26, by the direct action of the mandrel. However, as this propelling action is not positive the fibrous tube at the start is pulled along the mandrel manually by the use of an instrument such as a hooked wire, until the leading end of the rudimentary tubing reaches the rotating cylinder 58. It thus passes the close tapered running joint at 59 between the ends of the casing 26 and the cylinder, the interior bores of the casing and the cylinder being aligned and of the same diameter. The separate nature of stationary casing 26 and the rotated cylinder 58 is best indicated in FIGURE 6.

The cylinder 58 is rotated by the chain 60 running over the sprocket 61 in the same direction (clockwise as seen from the left) as the mandrel but at a lesser speed.

The longitudinal ribs 63 on the interior of the cylinder 58 firmly engage the outer periphery of the tubular fibrous mass and it then rotates with and at the speed of the revolving cylinder. The ribs 63 may be composed of five inch strips of one sixteenth drill rod welded to the interior of the cylinder at thirty degree spacings. There are available, of course, other alternate means of constructing these ribs as, for example, by machining flutes directly into the interior surface of the cylinder with the flutes closely adjoining, with peaks marking their juncture and serving as rib-like propelling elements. Short wire fingers or numerous small conical protuberances, or other radially and inwardly protruding elements, would also function satisfactorily but would likely be more difficult to fabricate.

As the rotation of cylinder 58, here taken to be forty-two revolutions per minute is slower than that of the mandrel, which under the conditions prescribed should be two hundred and ten revolutions per minute, the fibrous tube is held relatively stationary in respect to the faster rotating mandrel and is moved forwardly over the advancing path of the mandrel threading. This movement is at a rate of fourteen feet per minute determined by the difference between the speed of the cylinder and that of the mandrel and the pitch of the mandrel threading formed by the helically wound wire 56.

The rotational speed of the cylinder must of course be synchronized with the feeding rate of the veil into the stationary casing 26 and that in turn is dependent upon the delivery timing of the veil 16 upon conveyor 24 from the forming station. The specified cylinder rotation of forty-two per minute is selected to accommodate the veil delivery rate of thirty-three feet per minute.

The cylinder 58 is supported through a pair of annular journalling gudgeons or collars 64 and 65 projecting outwardly from the cylinder. Each of these collars has a cylindrical rim which rides upon a pair of rollers. The rollers 68 (only one of which is shown) for the end collar 64 are rotatively mounted in a flange 70 attached across the face of channel 30 and in an upright angle iron 72 extending upwardly from the edge of channel 30. Similarly, collar 65 turns on rollers 74 and 75 respectively held in bearings in flange 76 lying across channel 30 and angle iron 77 projecting upwardly therefrom.

To maintain cylinder 58 in position longitudinally, additional rollers and their bearing blocks are secured to flanges 70 and 76 and angle irons 72 and 77. As may be seen in FIGURE 3 a block 79, which is mounted on flange 76, supports a roller 80. The latter bears against the side of collar 65. Oppositely placed is a roller 82 upon block 83 held against the same side of collar 65 to receive the lateral thrust thereof. Any side movement of the cylinder 58 in the other longitudinal direction is prevented by corresponding rollers extending from mountings on flange 70 and angle iron 72 and bearing against the end collar 64 upon the side thereof opposite to that of collar 65 against which rollers 80 and 82 abut.

An electric motor 85 may be employed as the power source to rotate both the mandrel 42 and the cylinder 58. As illustrated in FIGURE 1 motor 85 is connected to gear box 86 containing speed reduction gearing transmitting torque to drive shaft 87 upon which sprocket 88 is keyed. The cylinder 58 is rotated through chain 60 running between sprocket 88 and sprocket 61 encircling and fixed to the cylinder. The intermediate drive shaft 90 from gear box 86 is connected to gearing within box 92 from which pulley 48 is actuated through pulley 45 on drive shaft 46.

To facilitate the operation of the tube shaping machine 28, and more importantly to provide smooth surfaces upon the inside and outside of the tubular product, binder curing heat is applied to both the interior and exterior surfaces of the tubular fibrous mass as it is first formed upon the smooth section of the mandrel and against the like evenly finished interior of the casing.

To reach the inner surface of the fibrous tube a heating rod 93 is extended into the bore of mandrel 42 from the end of the mandrel near which pulley 48 is located. The rod 93 is supported by housing 94 in which it is connected to an electrical source 95.

Heat is directed against the outer surface of the stationary casing 26 by radiant strip heating elements 96 and 97 extending lengthwise thereof in a circumferential series. These elements are supported by arcuate brackets 98 and 99. The elements 96 are reduced in length in comparison with the elements 97 so as not to project across the entering path of the veil into casing 26. The heat thus applied by elements 96 and 97 to casing 26 is transmitted therethrough to the peripheral portion of the evolving fibrous tube moving longitudinally in contact with the inner wall of the casing.

This early rapid curing of the binder in the external and internal surfaces of the fibrous tube has several beneficial results. It first prevents sticking of semi-cured binder to the shaping elements. Of greater significance is the tough, polished skin thus produced on the surfaces of the shaped insulating tube. This not only improves the appearance of the resulting product but gives it strength to resist impact and bear other forces met with in transportation and installation. When the product is utilized for a conduit the sleek inner surface facilitates the friction free flow of air therethrough. The close-grained, ironed exterior surface is further of benefit in connection with both pipe coverings and an independent conduit in that it is more easily kept clean, and this with its appearance, strength and impervious nature reduces the need for an outer fabric wrap.

With the stiffening provided by this preliminary curing a more positive hold of the incipient tube by the ribs on the rotating cylinder and by the threading on the mandrel is made possible. At the same time indentations by the ribs and threading are not retained in the fibrous tube surfaces due to the resilience of the cured fibrous layers, the curing heat having penetrated an appreciable distance within the fibrous stock of the tubular mass. Another advantage of this surface curing is that the tubular product of the shaping machine is dimensionally stabilized with the uncured center portion confined between the cured outer and inner cylindrical surface portions.

The formed tubing 102 discharged from the shaping apparatus 28 may be cut to desired length by an automatically motivated shearing mechanism such as saw 104. The tubular units 106, here shown as short sections suitable as pipe covering, are successively received upon belt conveyor 107 and carried through a suitable oven 109 in which the binder throughout the full fibrous glass stock is brought to a final cure. The units may then be sliced endwise to permit them to be opened to clamp over the pipe they are to insulate. This step is naturally omitted when the tubular product is to be used as independent conduit.

Glass fibers, other mineral fibers, and organic fibers, as well, in a broad range of sizes are reasonably suited for use in practicing at least major features of this invention. Fairly exact control of the specifications of the glass fibers may be exercised by selection of the orifice diameters through which the molten glass is discharged in fine stream form from the forehearth of the furnace. The ingredients of the basic glass composition also may be chosen to give certain characteristics to the fibers created therefrom. The force and volume of the gaseous blasts by which the rapidly cooling molten threads are attenuated into fibers may be varied to increase or decrease their elongating effect.

However, for purposes of this invention and with consideration given the qualities desired in the tubular insulating products, a fairly fine fiber between fifteen and twenty-five hundred-thousandths of an inch in diameter is preferred. A mass of such fibers has exceptional good insulating properties and is readily shaped and compacted. It should be understood that fibers in sizes other than those lying within the above range may be utilized with quite satisfactory results.

The formed veil 16 receives an impregnation of binder particles in a preferred proportion of approximately sixteen percent by weight, in the event a Vinsol-phenol formaldehyde formulation is employed. This quantity is subject to alteration depending upon the strength and porosity desired in the final product as well as upon the character of the fibers.

As previously indicated, the weight of the veil may be adjusted to fit the requirements of the insulating tubing being fabricated. Also the width of the veil may be selected to best serve the shaping process. Heavier veils of greater width are adaptable to the fabrication of large conduits, or coverings for pipe of substantial dimensions.

A quite generally produced veil of seventy-two inch width would ordinarily be used only in connection with tubular products of greater size such as those having an inside diameter of four or five inches. For tubes of lesser bulk, equipment delivering a narrower veil may be utilized or a broad veil may be sliced longitudinally to create divided veils of the desired dimensions. For light tubing the veil may have a width of eighteen inches or less.

The number of laminations or layers of the veil in the wrapped tubing may be set through control of the cylinder and mandrel rotation and these speeds may roughly range between ten and sixty revolutions per minute for the cylinder and between one and six hundred for the mandrel, with the mandrel speed always exceeding the cylinder speed.

For general purposes it is thought advisable to restrict the laminations to a number between four and fourteen. The lower number is accompanied by wider overlaps between plies which contribute to a less uniform tubular cross section while the larger number of layers slows the production rate. The recommended overlapping measurement is between two and ten inches. The number of layers and the overlap measurement between layers are, of course, directly related where other factors are unchanged.

The diameter of the mandrel may run ordinarily between one half to five inches to give comparable dimensions to the inner diameter of the pipe enveloping casings or of the insulated conduit being fabricated. Likewise, the casing and cylinder may have an inside diameter between one and seven inches according to the outside diameter desired in the final product.

While a density of three and one-half pounds per cubic foot in the completed tubing is thought about right from an overall commercial standpoint for general runs there may be demands for weights anywhere in the area of two and one-half to seven pounds which would be entirely feasible to produce. The heavier stock would have considerably greater strength and would thus be better qualified to serve as self-supporting conduit. In connection therewith a larger percentage of binder would help in establishing the sealed, impervious surface skins.

As there is a sliding contact between the smooth section of the mandrel and the tubing developed thereon due to the difference in their rotation and to the relative longitudinal movement of the tubular mass, a very desirable ironing action occurs during the accompanying curing of the binder tying together the surface fibers. A possible alternate arrangement would comprise a separate, similarly finished mandrel in place of the smooth portion of the disclosed embodiment. This could be rotated or held stationary and would serve the same purpose. However, it is believed to be a more complicated construction unbalanced by improved operation.

Another modification would entail a mandrel having a thread throughout its full length. There would be no special objection to the resulting imprints of the threading upon the interior of tubings designed for pipe coverings.

When the tubular product is intended for an independent conduit, extra binder may be sprayed on the narrow edge portion of the face of the veil which turns around in direct contact with the smooth first section of the mandrel. If this doesn't provide full imperviousness as required in some circumstances a plastisol coating or a plastic film wrap may be applied to the exterior of the finished product.

In reviewing the methods and apparatus herein disclosed it is considered clear that adequate means have been presented for attainment of the objects of this invention as recited in the introduction of this specification.

An effective, uninterrupted process and apparatus have been provided for fabricating an endless, constantly advancing, tubular body of fibrous structure. Uniform characteristics of the tubular product are assured by the continuous feed of the fibrous stock in veil form and the even distribution of the veil in overlying laminations. The tubing created is further superior due to its smooth toughened surfaces.

The features of the invention believed of principal importance include the receipt and continuous use of raw fibrous stock in strip form; the concomitant compacting, smoothing and binder curing of surface fibers in the initial stage of building the fibrous tubing; the separation of the propelling elements from the primary tube shaping means; having the propelling elements contacting only resilient cured areas of the semi-finished tubing; the easily controlled rotative means for adjusting density and regulating production rates; and the effective, cooperative association of elements in the apparatus and of the successive steps of the methods.

A basic concept involved in this invention comprises the introduction of a continuous body of fibrous glass stock through a molding opening in stationary, smooth-surfaced, shaping and compressing elements, curing the binder of at least the surface fibers as the continuous body passes through the molding opening and constantly pulling the continuous body from the shaping elements by members engaging binder cured portions of the body. This procedure is followed in the disclosed apparatus with a separate, stationary, smooth-surfaced first mandrel section and the associated, stationary casing.

An adaptation of this concept would be the directing of a continuous web of fibrous glass end-wise into and through an opening of semi-cylindrical section in a heated shaping member and pulling the web therethrough by engaging cured surface portions of the semi-cylindrical body by spiked rollers. This arrangement would lack that transmission and distribution of the pulling force provided by the overlapping of layers in the wrapping of the veil of the present specific disclosure. For this reason, in connection with such end-wise feeding, the web would need greater linear strength to prevent drafting of the web by the pulling force. This extra coherence could be incorporated in the fibrous web by the preliminary cure of a primary binder or by the inclusion in the web stock of longitudinally positioned continuous glass strands.

While for purposes of illustration, specific designs dimensions and compositions have been referred to herein, it should be understood that quite a broad range of specifications are adaptable to the products, apparatus and processes of this invention and that there are numerous modifications available considered within the scope of this invention and the appended claims.

We claim:

1. Apparatus for the production of tubular bodies from a continuous veil of fibers impregnated with an uncured binder including a cylindrical casing having a smooth interior surface, a lateral opening at one end of the casing for the entry of the veil into the casing, means delivering a continuous veil of fibers to the lateral opening, a mandrel axially positioned within the casing and around which the veil is helically wound, means for curing the binder in the portion of the veil contacting the casing and the mandrel, means rotating about the longitudinal axis of the casing adjacent the exit end thereof engaging the tubular mass developed by the helical winding of the veil and rotating said mass, and thread means engaging and advancing said mass longitudinally of the casing and discharging it therefrom, there being a relative difference in rotative movement of said mass and the thread means by which is effected the advancing and discharge of said mass.

2. Apparatus fully according to claim 1 in which the cylindrical casing is stationary.

3. Apparatus fully according to claim 1 in which the means rotating about the longitudinal axis of the casing comprises a rotating cylinder forming an extension of the casing and having a bore of equal diameter and in line with that of the casing, and there are radially and inwardly protruding elements within the bore of the rotating cylinder engaging the tubular mass developed by the helical winding of the veil, and rotating the mass.

4. An apparatus fully according to claim 1 in which the thread means advancing said mass longitudinally of the casing includes a thread formation on the mandrel.

5. An apparatus fully according to claim 1 in which there is a first section of the mandrel having a smooth surface and a second section of the mandrel, said thread means being formed on said second section of the mandrel.

6. Apparatus for the production of tubular fibrous bodies fully according to claim 1 in which the means for curing the binder in the portion of the veil contacting the casing and the mandrel includes heating elements associated with the casing and the mandrel.

7. Apparatus fully according to claim 1 in which there is a severing device cutting the discharged tubular mass to desired lengths and means for completing the cure of the binder throughout the full body of the tubular units into which the tubular mass is cut.

8. Apparatus for the production of tubular bodies including means for creating and delivering a continuous veil of fibers impregnated with an uncured binder, a cylindrical casing having a smooth interior surface and a longitudinally extending opening at one end of the casing for the lateral entry of the veil into the bore, a mandrel axially positioned within the casing and around which the veil is helically wound, means for curing the binder in the portion of the wound veil contacting the casing and the mandrel, means rotating about the longitudinal axis of the casing adjacent the exit end thereof engaging the tubular mass developed by the helical winding of the veil and rotating said mass, and thread means engaging and advancing said mass longitudinally of the casing and discharging it therefrom, there being a relative difference in rotative movement of said mass and the thread means by which is effected the advancing and discharging of said mass.

References Cited in the file of this patent

UNITED STATES PATENTS

| | | |
|---|---|---|
| 775,537 | McConnell | Nov. 22, 1904 |
| 1,146,477 | Cole | July 13, 1915 |
| 1,716,505 | Robinson | June 11, 1929 |
| 2,048,817 | Rosengarth | July 28, 1936 |
| 2,206,059 | Slayter | July 2, 1940 |
| 2,321,738 | Farny | June 15, 1943 |
| 2,331,146 | Slayter | Oct. 5, 1943 |
| 2,390,171 | Ratay | Dec. 4, 1945 |
| 2,399,260 | Taylor | Apr. 30, 1946 |
| 2,413,551 | Englund | Dec. 31, 1946 |
| 2,428,653 | Collins | Oct. 7, 1947 |
| 2,500,282 | Francis | Mar. 14, 1950 |
| 2,614,058 | Francis | Oct. 14, 1952 |
| 2,688,906 | Dokopil | Sept. 14, 1954 |
| 2,694,661 | Meyer | Nov. 16, 1954 |
| 2,766,160 | Bentov | Oct. 9, 1956 |
| 2,778,759 | Stephens et al. | Jan. 22, 1957 |
| 2,845,109 | Schneider | July 29, 1958 |
| 2,906,317 | Keyes | Sept. 29, 1959 |
| 2,941,915 | Manning | June 21, 1960 |

FOREIGN PATENTS

| | | |
|---|---|---|
| 161,843 | Australia | Mar. 10, 1955 |